United States Patent [19]

Green

[11] 3,724,965
[45] Apr. 3, 1973

[54] DOUBLE BLADED CUTTING TOOL
[75] Inventor: George C. Green, Royal Oak, Mich.
[73] Assignee: Devlieg Machine Company, Royal Oak, Mich.
[22] Filed: Aug. 25, 1971
[21] Appl. No.: 174,723

[52] U.S. Cl. ................................. 408/183, 408/153
[51] Int. Cl. ........................................... B23b 29/02
[58] Field of Search ...... 408/183, 182, 157, 153, 155; 29/105 A

[56] References Cited

UNITED STATES PATENTS

| 1,659,370 | 2/1928 | Magin | 408/183 |
| 2,537,517 | 1/1951 | Devlieg | 408/153 |

FOREIGN PATENTS OR APPLICATIONS

| 685,039 | 12/1952 | Great Britain | 408/153 |
| 1,045,695 | 10/1966 | Great Britain | 408/153 |

Primary Examiner—Andrew R. Juhasz
Assistant Examiner—Z. R. Bilinsky
Attorney—J. King Harness et al.

[57] ABSTRACT

A tool holder having a pair of adjustable cutting blades. The blades are mounted on supports which project from the opposite ends of a transverse bore in the tool holder. The supports are individually adjustable in a direction radially of the tool rotational axis. A single screw holds both cutters in their adjusted positions.

8 Claims, 2 Drawing Figures

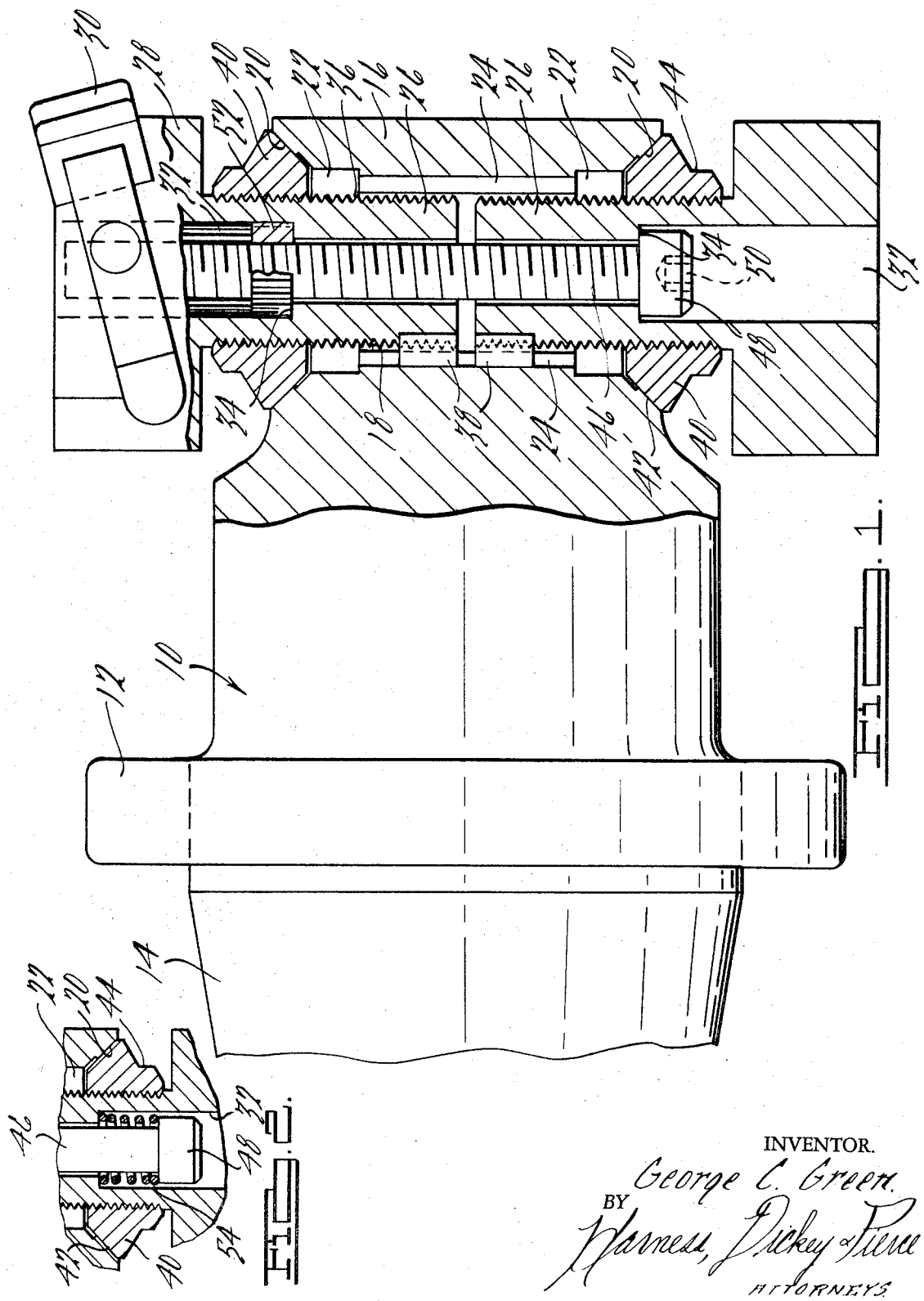

DOUBLE BLADED CUTTING TOOL

SUMMARY OF THE INVENTION

Double bladed cutting tools have been known in the metal cutting industry for some time. Such tools are frequently mounted in the spindle of a milling, boring, drilling or similar machine tool although they may be used on turning machines where the work rather than the tool is rotated. They are designed for rapid removal of metal from a previously drilled hole or the like. Many double bladed cutting tools have lacked adjustability. Others, while being adjustable, have lacked inherent accuracy and rigidity and have tended to follow a pre-existing hole. Thus, if a hole was improperly located when originally drilled, the error was perpetuated rather than corrected by the cutter. In still other tools, the cutters are not accurately aligned and one cutter tends to be loaded to a greater extent than the other cutter.

It is an object of the present invention to provide a double bladed cutting tool in which each cutter is individually adjustable and in which the exact alignment of the cutters is assured.

It is still another object of the present invention to provide a cutter which possesses a high degree of rigidity and is able to achieve a high degree of accuracy.

It is still another object of the present invention to provide a double bladed cutting tool which is highly convenient to use, is relatively inexpensive in construction, which utilizes a minimum number of parts and in which various surfaces and openings in the tool body can be formed with a single fixturing of the tool.

DESCRIPTION OF THE VIEWS OF THE DRAWING

FIG. 1 is a view partly in section and partly in elevation of a double bladed cutting tool constructed in accordance with the present invention; and FIG. 2 is a view of a portion of the structure illustrated in FIG. 1 and modified by the addition of a spring.

DESCRIPTION OF THE PREFERRED EMBODIMENT

Referring now to FIG. 1, the tool of the present invention is illustrated as employing a solid steel tool holder or body 10 having the usual drive flange 12 and a tapered shank 14 adapted to be positioned in the drive spindle (not shown) of a machine tool. It is to be understood, however, that the invention may also be embodied in a stationary tool holder adapted for use with a rotating workpiece. The forward end 16 of the body 10 is provided with a bore 18 extending radially there-through. Annular segmentally conical seats 20 are formed on the body 10 at the opposite ends of the bore 18 and concentric to the bore. Counterbores 22 are located between the seats 20 and the main central portion of the bore 18. A pair of diametrically opposite keyways 24 are formed on opposite sides of the bore 18 and extend axially of the bore 18 between the counterbores 22.

A pair of externally threaded cutter supports 26 are supported within the bore 18 and project from the opposite ends thereof. Each support 26 has a head 28 at its outer end on which is positioned a removable cutter blade 30. An opening 32 extends entirely through each support 26. The two openings 32 are aligned with one another and are coaxial with the axis of the bore 18. Each of the bores 32 are counterbored to define shoulders 34. The thread of each support 26, which is indicated at 36, has a crest diameter slightly smaller than the diameter of the bore 18 permitting the cutter to be fitted within the bore with a slight clearance therebetween. A key 38 projects laterally from each support 26 adjacent the inner end thereof. The keys are snugly but slidably fitted within one of the keyways 24. It will be noted that only one keyway 24 is used at a time but two such keyways are provided to permit 180° indexing of the cutters, if desired.

A pair of adjusting collars 40 are threaded onto the two supports 26 and have segmentally conical annular seats 42 which conformably engage the seats 20 to the tool body 10. The collars 40 have wrench receiving portions 44 to facilitate rotation thereof on the supports 26. It will thus be apparent that the collars 40 and supports 26 are coaxial with respect to one another and with respect to the bore 18. The seats 20 of the cutter body 10 as well as the bore 18 are formed with a single fixturing of the tool body 10, thus assuring exact concentricity and alignment thereof. Accordingly, the alignment of the two supports 26 is assured.

The supports 26 are held in the bore 18 by means of a screw 46 having a head 48 which seats against the shoulder 34 of one of the supports 26. The screw 46 is turned by the insertion of a suitable wrench or other tool (not shown) into a socket 50 formed in the head 48. The screw 46 is threaded into a nut 52 which has a serrated outer periphery and is press fit into the counterbored portion of the opening 32 of the other one of the supports 26. When the screw 46 is tightened, the two collars 40 are drawn tightly against the seats 20. When the screw 46 is loosened the collars 40 may be rotated to advance or retract the supports 26 axially of bore 18.

FIG. 2 illustrates a slightly modified form of the invention in which a spring 54 is interposed between the screw head 48 and the shoulder 34. The screw 46 is initially tightened enough to compress the spring 54 just slightly. When the cutters 30 become worn and it is desired to advance them longitudinally of the bore 18 to compensate for this wear, the collars 40 may be rotated to accomplish this adjustment with loosening the screw 46. The spring 54 will yield to permit this adjustment. The screw 46 will only have to be reset after the spring has been fully collapsed. It will, therefore, be appreciated that the addition of the spring 54 facilitates the use of the device.

It will be apparent that the utilization of the single screw 46 to lock both supports 26 in place considerably simplifies the use of the tool and enables an adjustment to be made in the cutter blades 30 in a shorter period of time. Furthermore one support 26 will control the position of the inner end of the other support 26. The entire structure affords a degree of accuracy and rigidity to the structure which is superior to other double bladed cutting tools known to applicant, with the alignment of the supports 26 being particularly precise.

What is claimed is:

1. A double bladed cutting tool including a tool body having a bore extending therethrough, a pair of annular seats at the opposite ends of said bore, a pair of externally threaded cutter supports supported in said bore and projecting from the opposite ends thereof, said supports having aligned openings therein, one of said supports having a shoulder adjacent the opening thereof and the other of said supports having means defining an internal thread surrounding the opening thereof, means preventing rotation of said supports in said bore while permitting movement of said supports along the length of said bore, a pair of internally threaded adjusting collars threaded on said supports and engageable with said seats and an elongated locking screw having a head seated against said support shoulder and threaded into the internal thread of said other support whereby the tightening of said screw will draw said collars against said seats and the loosening of said screw will permit the rotation of said collars on said supports, at least one of said openings being open to the outer end of its support to provide tool axis to said screw.

2. The structure set forth in claim 1 in which the openings of said cutter supports extend entirely therethrough in a direction parallel to the axis of said bore.

3. The structure set forth in claim 1 in which said shoulder is defined by a counterbore in the opening of said one support.

4. The structure set forth in claim 1 in which said means defining said internal thread in said other support is defined by a nut press fit in said other support.

5. The structure set forth in claim 1 including a head on said screw, said head being recessed within said one support and having a socket within its head adapted to receive a wrench for rotation of said screw.

6. The structure set forth in claim 1 in which said seats are of segmentally conical shape.

7. The structure set forth in claim 1 in which said means preventing rotation comprises at least one keyway extending longitudinally of said bore and keys projecting laterally from said supports.

8. The structure set forth in claim 1 including a spring between said support shoulder and said screw head.

* * * * *